US005996471A

United States Patent [19]

Aikawa et al.

[11] Patent Number: 5,996,471

[45] Date of Patent: Dec. 7, 1999

[54] ALUMINUM ALLOY FOR INTERNAL-COMBUSTION PISTON, AND ALUMINUM ALLOY PISTON

[75] Inventors: Tomohiro Aikawa, Okazaki; Akinari Ishikawa, Kariya; Soichi Hara, Toyota, all of Japan

[73] Assignee: Aisin Seiki Kabushiki Kaisha, Kariya, Japan

[21] Appl. No.: 09/106,894

[22] Filed: Jun. 30, 1998

[51] Int. Cl.[6] .......... F16J 1/04

[52] U.S. Cl. .......... 92/222; 123/193.6; 148/439; 148/440; 420/534; 420/537

[58] Field of Search .......... 92/222; 123/193.6; 148/437, 438, 439, 440; 420/533, 534, 537, 538

[56] References Cited

U.S. PATENT DOCUMENTS

| | | | |
|---|---|---|---|
| 4,562,327 | 12/1985 | Mielke | 219/76.11 |
| 4,643,079 | 2/1987 | Brann et al. | 92/222 |
| 5,115,770 | 5/1992 | Yen et al. | 92/222 X |
| 5,162,065 | 11/1992 | Scott et al. | 148/438 |
| 5,169,462 | 12/1992 | Morley et al. | 148/439 |

FOREIGN PATENT DOCUMENTS

| | | |
|---|---|---|
| 60-47898 | 10/1985 | Japan . |
| 8-104937 | 4/1996 | Japan . |

*Primary Examiner*—Hoang Nguyen
*Attorney, Agent, or Firm*—Oblon, Spivak, McClelland, Maier & Neustadt, P.C.

[57] ABSTRACT

An aluminum alloy for internal-combustion engine pistons has good high-temperature strength and good abrasion resistance. It comprises from 2 to 5% by weight of copper, from 13 to 16% by weight of silicon, from 0.2 to 1.3% by weight of magnesium, from 1.0 to 2.5% by weight of nickel from 0.05 to 0.2% by weight of vanadium and from 0.004 to 0.02% by weight of phosphorus, with the balance of aluminum. To produce the piston, a melt of the aluminum alloy having the defined composition is cast and then aged under heat at 220 to 260° C. for 3 to 5 hours (T5 treatment) or, after having been cast, heated at 480 to 510° C. for 3 to 10 hours for solution treatment and then aged under heat at 240 to 260° C. for 3 to 5 hours (T6 or T7 treatment).

8 Claims, No Drawings

ALUMINUM ALLOY FOR INTERNAL-COMBUSTION PISTON, AND ALUMINUM ALLOY PISTON

BACKGROUND OF THE INVENTION

1. Field of the Invention

The present invention relates to an aluminum alloy with good high-temperature strength and good abrasion resistance f or internal-combustion pistons, which is suitable for pistons to be used in internal-combustion engines such as diesel engines and gasoline engines, and also to pistons comprising the aluminum alloy.

2. Description of the Related Art

Hyper-eutectic Al—Si alloys that contain Si in an amount of not smaller than 12.6% by weight have a small thermal expansion coefficient and good abrasion resistance. While solidifying, the melt of such an Al—Si alloy produces primary crystals of pro-eutectic Si having high hardness. Therefore, the alloys are used for internal-combustion engine pistons that require high abrasion resistance. However, the machine workability of the alloys is poor since the growth of pro-eutectic Si therein is too great.

For effective utilization of energy resources, recently, it is desired to increase the combustion efficiency of internal-combustion engines. The increase in the combustion efficiency involves an increase in combustion temperatures, for which various parts that constitute the internal-combustion engines, especially pistons, require good high-temperature strength.

For conventional internal-combustion engine pistons, often used are eight types of aluminum alloys of JIS H5202 (AC8A, AC8B, AC8C). These are all Al—Si—Cu—Mg alloys, of which AC8A and AC8B additionally contain Ni. However, these conventional aluminum alloys have poor high-temperature strength.

Japanese Patent Publication (JP-B) Sho-60-47898 discloses an improved aluminum alloy which is prepared by adding V and/or Mo to an Al—Si—Cu—Mg alloy and which has good high-temperature strength while still having good castability intrinsic to the Al—Si—Cu—Mg alloy base.

Japanese Patent Application Laid-Open (JP-A) Hei-8-104937 discloses a method for improving both the high-temperature strength and the abrasion resistance of an Al—Si—Cu—Mg alloy by adding P, Ca, Fe and Ti to the alloy, in which the ratio of P and Ca to the other additives is controlled to fall between 0.5 and 50 by weight so that the action of P to produce fine pro-eutectic Si grains is protected from being attenuated by Ca and so that the action of Ca to improve the eutectic texture of the alloy is protected from being attenuated by P.

However, the techniques disclosed in these publications are still problematic in that the alloys proposed therein are not resistant to thermal loads to be applied to the proposed internal-combustion pistons, as their strength at high temperatures (especially, at 250 to 300° C.) is poor, and that the thermal expansion coefficient of the alloys is large and the abrasion resistance thereof is poor, as the uppermost Si content of the alloys is limited to 13%.

Also known are nine types of aluminum alloys of JIS H5202 (AC9A, AC9B) having a low thermal expansion coefficient and improved abrasion resistance which, however, are still problematic in that their high-temperature strength is low and their castability and workability is extremely poor.

SUMMARY OF THE INVENTION

The present invention has been made in consideration of the current situation noted above, and has as an object to provide an aluminum alloy with good high-temperature strength and good abrasion resistance for internal-combustion pistons, and to provide internal-combustion pistons made of the aluminum alloy.

The aluminum alloy for internal-combustion pistons of the invention comprises from 2 to 5% by weight of copper, from 13 to 16% by weight of silicon, from 0.2 to 1.3% by weight of magnesium, from 1.0 to 2.5% by weight of nickel, from 0.05 to 0.2% by weight of vanadium and from 0.004 to 0.02% by weight of phosphorus, with the balance of aluminum. The aluminum alloy piston of the invention is characterized by being made of the aluminum alloy noted above.

The aluminum alloy piston of the invention is preferably produced by casting an aluminum alloy melt having the composition defined above followed by aging it under heat at 220 to 260° C. for 3 to 5 hours (T5 treatment), or followed by heating the cast melt at 480 to 510° C. for 3 to 10 hours for solution treatment and further followed by aging the resulting solid-solution alloy under heat at 240 to 260° C. for 3 to 5 hours (T6 or T7 treatment).

DETAILED DESCRIPTION OF THE INVENTION

Cu to be added to the aluminum alloy for internal combustion pistons of the invention is an element effective for improving the high-temperature strength of the alloy and for promoting the crystallization of pro-eutectic Si in the alloy to thereby improve the abrasion resistance of the alloy. If its amount added is smaller than 2% by weight, Cu could not exhibit sufficiently its effect noted above. However, even if larger than 5% by weight, the effect of Cu would not be more augmented.

Si is an indispensable alloying element to give eutectic or pro-eutectic Si which is effective for improving the abrasion resistance of the alloy, for lowering the thermal expansion coefficient thereof, and for increasing the high-temperature strength thereof, and this additionally has the ability to improve the alloy melt fluidity. In addition, Si reacts with the co-existing Mg to give $Mg_2Si$ that is effective for age-hardening of the alloy. If the amount of Si added is smaller than 13% by weight, its effect for improving the high-temperature strength and the abrasion resistance of the alloy and for lowering the thermal expansion coefficient thereof is poor. However, if larger than 16% by weight, too much Si will greatly worsen the castability and the workability of the alloy.

Mg bonds to Si to give $Mg_2Si$ that is effective for age-hardening of the alloy. If the amount of Mg added is smaller than 0.2% by weight, the age-hardening of the alloy will be insufficient. However, if larger than 1.3% by weight, too much $Mg_2Si$ will crystallize out in the cast alloy whereby the alloy will be unfavorably brittle.

Ni is an element effective for improving the high-temperature strength of the alloy, while promoting the crystallization of pro-eutectic Si in the alloy to thereby improve the abrasion resistance of the alloy. If the amount of Ni added is smaller than 1.0% by weight, the high-temperature strength of the alloy could not be improved sufficiently. However, if larger than 2.5% by weight, too much Ni will make the alloy brittle.

V is an element effective for improving the high-temperature strength of the alloy and for promoting uniform dispersion of pro-eutectic Si in the alloy. If the amount of V added is smaller than 0.05% by weight, the strength of the alloy will be improved insufficiently. However, even if larger than 0.2% by weight, no significant further increase in the high-temperature strength of the alloy could be expected, and too much V will be difficult to uniformly dissolve in the alloy.

P is an element that assists in forming fine grains of pro-eutectic Si, while improving the workability and the mechanical properties of the alloy. If its amount added is smaller than 0.004% by weight, the effect of P will be poor. However, if larger than 0.02% by weight, too much P will lower the fluidity of the alloy melt, and the texture of the cast alloy will be not uniform.

Regarding the aging treatment of the alloy of the invention, of which the Cu and Ni contents are high, if the temperature for the T5 treatment is 220° C. or lower or if the temperature for the T6 or T7 treatment is 240° C. or lower, the dimensional stability of the alloy will be poor. However, the alloy will be over-aged at 260° C. or higher, and the strength of the over-aged alloy will be low. Regarding the aging time for the alloy, if it is shorter than 3 hours, the aging will be ineffective. However, even if aged longer than 5 hours, such too long aging will not be more effective for further improving the alloy.

Regarding the solution treatment of the alloy of the invention, Cu, Ni and Mg must be sufficiently dissolved to be in solid solution in the alloy. For this, if the heating temperature is lower than 480° C., those elements could not be sufficiently dissolved to be in solid solution in the alloy. However, if higher than 510° C., large and coarse grains will be formed and the intergranular boundaries will be partly melted to deteriorate the mechanical properties of the alloy material. In addition, if the heating time for the solution treatment is shorter than 3 hours, the alloy could not have a good solid solution phase. The solution treatment will be saturated within 10 hours, and heating longer than 10 hours does not bring about any better result. After having been subjected to the solution treatment, the alloy is quenched in warm water. For this, quenching in cold water is unfavorable since the quenching strain is too large and the alloy will have great dimension change.

The aluminum alloy piston of the invention can be produced by casting the aluminum alloy that has the composition noted above, then aging it optionally after solution treatment, and thereafter machining the thus-aged alloy into intended shapes. For casting the alloy, various methods are employable, for example gravity casting.

Now, the invention is described in more detail with reference to the following Examples, which, however, are not intended to restrict the scope of the invention.

Production and Evaluation of Aluminum Alloy for Internal Combustion Pistons

EXAMPLE 1

Various aluminum alloy melts were prepared, each having the composition of Si, Cu, Mg, Ni, V, P and Al as in Table 1 below, and cast into the mold illustrated in FIG. 1 of JIS H5202. Each cast ingot was subjected to solution treatment at 495° C. for 3 hours, and then quenched in warm water at 75° C. Next, they were aged at 250° C. for 3 hours, and then cooled in air to prepare samples Nos. 1 to 9.

Each sample was cut into JIS No. 4 test pieces, which were subjected to a high-temperature tensile test. The test data obtained are shown in Table 2 below. In the tensile test, each test piece was pre-heated at a test temperature of 250° C. or 300° C. for 100 hours; and then tested for tensile strength, 0.2% yield strength, and elongation.

TABLE 1

| Samples | | Si (wt. %) | Cu (wt. %) | Mg (wt. %) | Ni (wt. %) | V (wt. %) | P (wt. %) | Al |
|---|---|---|---|---|---|---|---|---|
| Samples of the Invention | 1 | 15.01 | 4.32 | 1.23 | 2.30 | 0.18 | 0.004 | balance |
| | 2 | 14.00 | 4.08 | 0.96 | 2.22 | 0.20 | 0.004 | balance |
| | 3 | 13.00 | 4.03 | 0.92 | 1.90 | 0.16 | 0.004 | balance |
| | 4 | 13.72 | 2.00 | 1.08 | 2.36 | 0.20 | 0.004 | balance |
| | 5 | 14.28 | 4.34 | 1.01 | 2.49 | 0.05 | 0.004 | balance |
| Comparative Samples | 6 | 11.90 | 1.02 | 1.29 | 1.04 | — | — | balance |
| | 7 | 9.38 | 2.93 | 0.96 | 0.01 | — | — | balance |
| | 8 | 15.00 | 4.04 | 1.13 | 2.13 | — | 0.004 | balance |
| | 9 | 17.40 | 1.04 | 0.78 | 1.84 | — | 0.006 | balance |

TABLE 2

| | | Test Temperature, 250° C. | | | Test Temperature 300° C. | | |
|---|---|---|---|---|---|---|---|
| Samples | | Tensile Strength $\sigma_B$ (MPa) | 0.2% Yield Strength $\sigma_{0.2}$ | Elongation $\delta$ (%) | Tensile Strength $\sigma_B$ (MPa) | 0.2% Yield Strength $\sigma_{0.2}$ | Elongation $\delta$ (%) |
| Samples of the Invention | 1 | 143 | 121 | 2.1 | 92 | 73 | 4.6 |
| | 2 | 149 | 121 | 2.2 | 90 | 72 | 4.8 |
| | 3 | 153 | 125 | 2.7 | 93 | 70 | 7.4 |
| | 4 | 141 | 120 | 2.5 | 94 | 71 | 5.9 |
| | 5 | 141 | 122 | 2.3 | 91 | 70 | 5.3 |
| Comparative Samples | 6 | 121 | 97 | 8.0 | 71 | 56 | 15.7 |
| | 7 | 112 | 91 | 12.8 | 67 | 51 | 22.0 |
| | 8 | 127 | 104 | 2.4 | 75 | 58 | 5.0 |
| | 9 | 126 | 109 | 2.1 | 79 | 63 | 4.0 |

In Table 2, the tensile strength indicates the maximum stress of the sample being tested in the tensile test; and the 0.2% yield strength indicates the stress of the sample to produce 0.2% permanent strain. As in Table 2, in the two tests at a testing temperature of 250° C. and 300° C., both the tensile strength and the 0.2% yield stress of the samples Nos. 1 to 5 of the invention were higher by from 20 to 30% than those of the comparative samples Nos. 6 to 9. The data verify that the aluminum alloys of the invention have better high-temperature strength than the comparative aluminium alloys.

EXAMPLE 2

Various aluminium alloy melts were prepared, each having the composition of Si, Cu, Mg, Ni, V, P and Al as in Table 3 below, and cast into the mold illustrated in FIG. 1 of JIS H5202. Each cast ingot was subjected to solution treatment at 495° C. for 3 hours and then quenched in warm water at 75° C. Next, these were aged at 250° C. for 3 hours, and then cooled in air to prepare samples Nos. 10 to 16.

Each sample was cut into test pieces for abrasion, which were subjected to an abrasion test using an LFW abrasion tester. The test data obtained are shown in Table 3.

TABLE 3

| Samples | | Si (wt. %) | Cu (wt. %) | Mg (wt. %) | Ni (wt. %) | V (wt. %) | P (wt. %) | Abrasion Loss (mm) |
|---|---|---|---|---|---|---|---|---|
| Samples of the Invention | 10 | 13.05 | 3.10 | 0.95 | 2.05 | 0.20 | 0.004 | 3.88 |
| | 11 | 13.72 | 2.00 | 1.08 | 2.36 | 0.20 | 0.004 | 3.41 |
| | 12 | 14.28 | 4.34 | 1.01 | 2.49 | 0.05 | 0.004 | 3.36 |
| | 13 | 15.01 | 4.32 | 1.23 | 2.30 | 0.18 | 0.004 | 3.19 |
| Comparative Samples | 14 | 9.38 | 2.93 | 0.96 | 0.01 | — | — | 7.31 |
| | 15 | 11.78 | 1.05 | 1.11 | 1.21 | — | — | 6.49 |
| | 16 | 11.97 | 1.05 | 1.13 | 1.15 | 0.20 | — | 6.43 |

From Table 3, it is known that the abrasion loss in the samples Nos. 10 to 13 of the invention is reduced to about 50% of that in the comparative samples Nos. 14 to 16, that is, the abrasion resistance of the samples of the invention is much improved.

As has been mentioned in detail hereinabove, the aluminum alloy of the invention has good high-temperature strength and good abrasion resistance and has a small thermal expansion coefficient, and is suitable for internal-combustion engine pistons. In addition, the aluminum alloy piston of the invention has good high-temperature strength and good abrasion resistance and has a small thermal expansion coefficient, and can be used in any of gasoline engines and diesel engines.

While the invention has been described in detail and with reference to specific embodiments thereof, it will be apparent to one skilled in the art that various changes and modifications can be made therein without departing from the spirit and scope thereof.

We claim:

1. An aluminum alloy, for internal-combustion pistons, that comprises from 2 to 5% by weight of copper, from 13 to 16% by weight of silicon, from 0.2 to 1.3% by weight of magnesium, from 1.0 to 2.5% by weight of nickel, from 0.05 to 0.2% by weight of vanadium and from 0.004 to 0.02% by weight of phosphorus, with a balance of aluminum.

2. An aluminum alloy piston, for internal-combustion engines, that comprises from 2 to 5% by weight of copper, from 13 to 16% by weight of silicon, from 0.2 to 1.3% by weight of magnesium, from 1.0 to 2.5% by weight of nickel, from 0.05 to 0.2% by weight of vanadium and from 0.004 to 0.02% by weight of phosphorus, with a balance of aluminum.

3. The aluminum alloy piston as claimed in claim 2, wherein the aluminum alloy piston is formed by casting an aluminum alloy to form a cast alloy, and then aging the cast alloy under heat at 220 to 260° C. for 3 to 5 hours.

4. The aluminum alloy piston as claimed in claim 2, wherein the aluminum alloy piston is formed by casting an aluminum alloy to form a cast alloy, then subjecting the cast alloy to solution treatment under heat at 480 to 510° C. for 3 to 10 hours, and then aging the cast alloy under heat at 240 to 260° C. for 3 to 5 hours.

5. A method of manufacturing a piston, the method comprising forming a piston from the aluminum alloy of claim 1.

6. The method as claimed in claim 5, further comprising casting the aluminum alloy to form a cast alloy, and then aging the cast alloy under heat at 220 to 260° C. for 3 to 5 hours.

7. The method as claimed in claim 5, further comprising casting the aluminum alloy to form a cast alloy, then subjecting the cast alloy to solution treatment under heat at 480 to 510° C. for 3 to 10 hours, and then aging the cast alloy under heat at 240 to 260° C. for 3 to 5 hours.

8. A method of using an aluminum alloy piston, the method comprising using the aluminum alloy piston of claim 2 in an internal-combustion engine.

* * * * *

UNITED STATES PATENT AND TRADEMARK OFFICE

CERTIFICATE OF CORRECTION

PATENT NO. : 5,996,471

DATED : December 7, 1999

INVENTOR(S): Tomohiro AIKAWA et al.

It is certified that an error appears in the above-identified patent and that said Letters Patent is hereby corrected as shown below:

On the title page, item [30], the Foreign Application Priority Data . It should read as follows:

--[30] Foreign Application Priority Data

Jun. 30, 1997 [JP] Japan......................9-173893--

Signed and Sealed this

Second Day of January, 2001

Attest:

Q. TODD DICKINSON

*Attesting Officer*

*Commissioner of Patents and Trademarks*